United States Patent
Thompson et al.

(10) Patent No.: US 11,815,187 B2
(45) Date of Patent: Nov. 14, 2023

(54) 3-PORT VALVE

(71) Applicant: MAAG GERMANY GMBH, Grossostheim (DE)

(72) Inventors: Drew Thompson, Rock Hill, SC (US); Carl Kelley, Monroe, NC (US)

(73) Assignee: MAAG GERMANY GMBH, Grossostheim (DE)

( * ) Notice: Subject to any disclaimer, the term of this patent is extended or adjusted under 35 U.S.C. 154(b) by 0 days.

(21) Appl. No.: 17/585,485

(22) Filed: Jan. 26, 2022

(65) Prior Publication Data

US 2023/0235825 A1 Jul. 27, 2023

(51) Int. Cl.
| | |
|---|---|
| *F16K 11/10* | (2006.01) |
| *F16K 11/14* | (2006.01) |
| *F16K 11/22* | (2006.01) |

(52) U.S. Cl.
CPC ............ *F16K 11/105* (2013.01); *F16K 11/14* (2013.01); *F16K 11/22* (2013.01); *Y10T 137/87877* (2015.04)

(58) Field of Classification Search
CPC ....... Y10T 137/87877; Y10T 137/6579; F16K 11/22; F16K 11/20; F16K 49/005
See application file for complete search history.

(56) References Cited

U.S. PATENT DOCUMENTS

| | | | | | |
|---|---|---|---|---|---|
| 1,099,713 | A | * | 6/1914 | Morris | .................... F16K 11/22 137/883 |
| 1,121,730 | A | * | 12/1914 | Keely | ..................... F16K 11/22 137/886 |

(Continued)

*Primary Examiner* — Robert K Arundale
(74) *Attorney, Agent, or Firm* — WOODLING, KROST AND RUST (57) ABSTRACT

The invention relates to a 3-port valve for passing fluids therethrough, having a valve body, a port, a first sub-port and a second sub-port, with the port being adjoined by a main line which ends in a connecting region, said first sub-port having a first sub-port line that is connected to the connecting region, said second sub-port having a second sub-port line that is connected to the connecting region, with at least one valve member being arranged in the connecting region, which valve member can be displaced along a valve member axis between an opening position and a closed position thereof in the connecting region, so that, in a first valve position, the port is fluidically connected to the first sub-port, in a second valve position, the port is fluidically connected to the second sub-port, in a third valve position, the port is fluidically connected to both the first and second sub-ports, in a fourth valve position, the port is fluidically connected neither to the first sub-port nor to the second sub-port. The invention is characterized in that the valve body is formed from a high-tempered steel, or other suitable material, with the valve body being produced from a solid ingot and with the connecting region, the main port, the first sub-port line and the second sub-port line having been machined into the steel ingot. Heat transfer medium lines for passing a HTM therethrough are also machined into the same valve body to regulate the temperature of the fluid. Simultaneously or alternatively, electric heating cartridge receptacles may be machined into the valve body ingot.

19 Claims, 4 Drawing Sheets

(56) References Cited

U.S. PATENT DOCUMENTS

| | | | | |
|---|---|---|---|---|
| 3,476,152 | A * | 11/1969 | Looke | B65B 37/16 |
| | | | | 137/625.48 |
| 3,566,917 | A * | 3/1971 | White | F16K 27/0263 |
| | | | | 137/883 |
| 4,081,231 | A * | 3/1978 | Herrington | B29C 48/10 |
| | | | | 425/464 |
| 4,506,704 | A * | 3/1985 | Boom | B65G 47/72 |
| | | | | 193/31 R |
| 4,911,201 | A * | 3/1990 | Nichols | F16K 27/0263 |
| | | | | 137/561 A |
| 5,499,652 | A * | 3/1996 | Schnaus | B29C 48/695 |
| | | | | 137/340 |
| 5,499,657 | A * | 3/1996 | Schmitt | F16K 1/222 |
| | | | | 137/883 |
| 6,148,861 | A * | 11/2000 | Finkeldei | F16K 11/207 |
| | | | | 137/883 |
| 6,763,852 | B1 * | 7/2004 | Finkeldei | F16K 11/20 |
| | | | | 251/118 |
| 9,127,777 | B2 * | 9/2015 | Schamann | B29B 7/801 |

* cited by examiner

3-PORT VALVE

BACKGROUND OF THE INVENTION

1. Field of the Invention

The invention relates to a 3-port valve for passing fluids therethrough, in particular thermoplastics fluids and polymer melts, having a main inlet port line and two outlet sub-port lines. Multiple linear actuated valve members may be actuated singly or together to allow flow from the main port line to exit a first sub-port line, to exit a second sub-port line, to exit both the first sub-port line and second sub-port line, or to block flow from exiting either sub-port line.

2. Description of the Prior Art 3-port valves of this type, used for regulating the flow of fluids, such as in particular thermoplastics and polymer melts, have been known for some time. They come in a wide variety of designs, each including a valve body. In addition, a valve port, as well as first and second sub-ports are provided. A main line is connected to the port, which terminates in a connecting region. The first sub-port is provided with a first sub-port line that is connected to said connecting region. The second sub-port is provided with a second sub-port line that is connected to said connecting region. In said connecting region, there is at least one valve member that is mounted so as to be displaceable between an opening position and a closed position thereof along a valve member axis. In a first valve position, the port is fluidically connected to the first sub-port. In a second valve position, the port is fluidically connected to the second sub-port. In a third valve position, the port is fluidically connected to both the first and second sub-ports. In a fourth valve position, the port is not fluidically connected to either the first sub-port or the second sub-port. A heating or cooling system is arranged around the valve body to provide heating or cooling for the valve body from the outside, usually in the form of an external heating jacket. Typically, the valve bodies are of a multi-part and modular design. This valve body design is typically in the form of a heavy, cylindrical pipe wherein the main port line is cut into one side of the pipe and welded thereto, and the sub-port lines are cut into another side of the pipe and welded thereto. The pipe forms the valve body, and the valve member(s) moves longitudinally within the pipe to direct flow from the inlet port to one or both outlet sub-ports. A second pipe of larger diameter may surround the valve body to form a heating jacket, with heat transfer medium (HTM) passing therethrough. Again, connections for inlets and outlets for the HTM are welded to the external heating jacket pipe, and the heating jacket pipe is welded to the main and sub-port lines passing therethrough.

However, this well-known design of a 3-port valve is disadvantageous in that it takes up a lot of space and it is very heavy. Moreover, it requires a special support frame. Also, the associated heating or cooling device is not very efficient and has to be mounted on the valve body from the outside for this purpose. Another problem is that the valve will warp at high operating temperatures, which may result in jamming of the valve member. A further disadvantage is that the weldments associated with the connections to the valve body pipe and the heating device pipe can fail due to the thermal stresses and fatigue involved, resulting in frequent leaking of the valves and their heating jackets, and subsequent downtime due to needed repairs.

SUMMARY OF THE INVENTION

It is the object of the invention to further develop a 3-port valve of the type specified above in such a way that a compact design is obtained which does not have the above-mentioned shortcomings. In particular, the inventive 3-port valve should be capable of operating reliably even at high temperatures and high pressures, for example when a polymer melt is the fluid to be passed therethrough. The inventive valve should not leak, as there are no weldments on the valve body which might fail and cause leaks.

The invention is based on the insight that, on the one hand, using a design with a valve body made of a steel ingot will take up considerably less space, and, on the other hand, such a valve body will also be capable of withstanding high pressures and temperatures and can thus be used at such high pressures and temperatures without any problems. Also, there are no weldments involved in the construction of the valve body of the present invention, so the leakages due to weldment failures is avoided. The heating means of the valve body is integral with the valve body, being formed and machined from the same ingot, so leakage failures in the heating device are also avoided.

For this reason, the invention provides for the valve body being made of a solid ingot, and the connecting region, the main line, the first and second sub-port lines, as well as the heat transfer medium lines, having been machined into said solid ingot. This will not only significantly reduce the space required, but also the manufacturing costs.

Preferably, the solid ingot and therefore the valve body is formed of a highly quenched and tempered steel.

A solid ingot is a rectangular piece which, before being processed, typically machined, into a valve body, is larger than the finished valve body without attachments. The solid ingot may additionally be subjected to a forging process.

To prevent temperature changes in the fluid passing through it, the valve body may be provided with at least one cooling/heating line for a heat transfer medium. The at least one cooling/heating line is also machined into the valve body and surrounds the valve members and connecting region. This at least one cooling/heating line with HTM passing therethrough will act to keep the temperature in the valve body constant so that the fluid will not undergo any temperature change as it flows through the 3-port valve As an alternative or in addition, the valve body may have at least one receptacle for at least one cooling/heating element that is adapted to be inserted into the receptacle of the valve body. For this purpose, electrical heating can be provided, for example by means of heating cartridges that are inserted into the receptacle.

Preferably, the receptacles and/or the cooling/heating line take the form of bores machined into the solid ingot, at least in certain areas thereof. This simplifies its production. Using CNC machines, the valve body with the receptacle and/or the cooling/heating line can be produced in a simple manner.

A homogeneous temperature distribution within the valve body is also achieved in that the receptacle and/or the cooling/heating line extend in different directions within the valve body.

In some embodiments, the valve body may be surface-hardened. This may increase durability and long-life fatigue strength by reducing abrasion, wear, and deformation.

In one embodiment of the invention, a first valve member and a second valve member are arranged opposite one another. Said valve members are each adapted to be displaced between an opening position and a closed position thereof along the common valve member axis in the connecting region. The first valve position is constituted by an opening position of the first valve member and a closed position of the second valve member. The second valve position is constituted by an opening position of the second valve member and a closed position of the first valve member. The third valve position is constituted by an opening position each of the first and second valve members. The fourth valve position is constituted by a closed position each of the first and second valve members. The fact that two valve members are provided increases the reliability of the 3-port valve. In addition, there are other possible applications that improve the flow behavior of the fluid to be conducted through, as will be evident from what follows below.

In particular, the first sub-port line is oriented at a first angle relative to the valve member axis and thus relative to the longitudinal axis of the connecting region.

As an alternative or in addition, the second sub-port line may be oriented at a second angle relative to the valve member axis and to the longitudinal axis of the connecting region.

Preferably, the first and second angles add up to 180°.

In one embodiment of the invention, said valve member(s) is/are adapted to be rotated by 180° when being displaced from the opening position into the closed position.

The front portion of the first valve member in the opening position may have a chamfer corresponding to the first angle.

Further, the front portion of the second valve member in the opening position may have a chamfer corresponding to the second angle.

The first and second angles may be each measured clockwise or counterclockwise, with respect to the valve member axis.

In the closed position of the first and second valve members, their front portions will provide a positive sealing action on an annular surface towards the valve body. This is a simple way to prevent leakage.

The main port line runs at an angle, in particular at a right angle, relative to the valve member axis.

A longitudinal axis of the connecting region and the valve member axis are identical.

Preferably, the fluid passed through has an operating pressure of up to 300 bar.

At the same time, the operating temperature of the fluid passed through may be as high as 320° C.

In one embodiment of the invention, the fluid passed through is a thermoplastic resin, more precisely a polymer melt.

To increase the cooling/heating efficiency of the valve body, several cooling/heating lines are provided which are arranged in the form of a cage of cooling/heating lines. These cooling/heating lines are formed within the valve body and are integral therewith and may be drilled into or machined into the valve body.

In this case, the cooling/heating lines in the valve body may all have the same diameter.

In particular, a heat transfer medium is introduced into the cooling/heating lines, for example superheated steam or thermal oil.

For an even more compact design, a first vent or drain valve is integrally provided in the valve body between the connecting region and the first sub-port, and/or a second vent or drain valve is integrally provided between the connecting region and the second sub-port.

Preferably, the connecting region, the main line, the first sub-port line, the second sub-port line, the first valve member and the second valve member each are circular in cross section. This ensures simple and cost-effective production.

To increase its efficiency even more, the valve body is thermally insulated on the outside, more specifically insulating plates are mounted on the valve body.

Additional advantages, features and possible applications of the present invention will be apparent from the description which follows, in which reference is made to the embodiments illustrated in the drawings.

BRIEF DESCRIPTION OF THE DRAWINGS

Throughout the description, claims and the drawings, those terms and associated reference signs are used as are stated in the list of reference signs below.

In the Drawings.

DETAILED DESCRIPTION OF THE INVENTION

Figure 6:
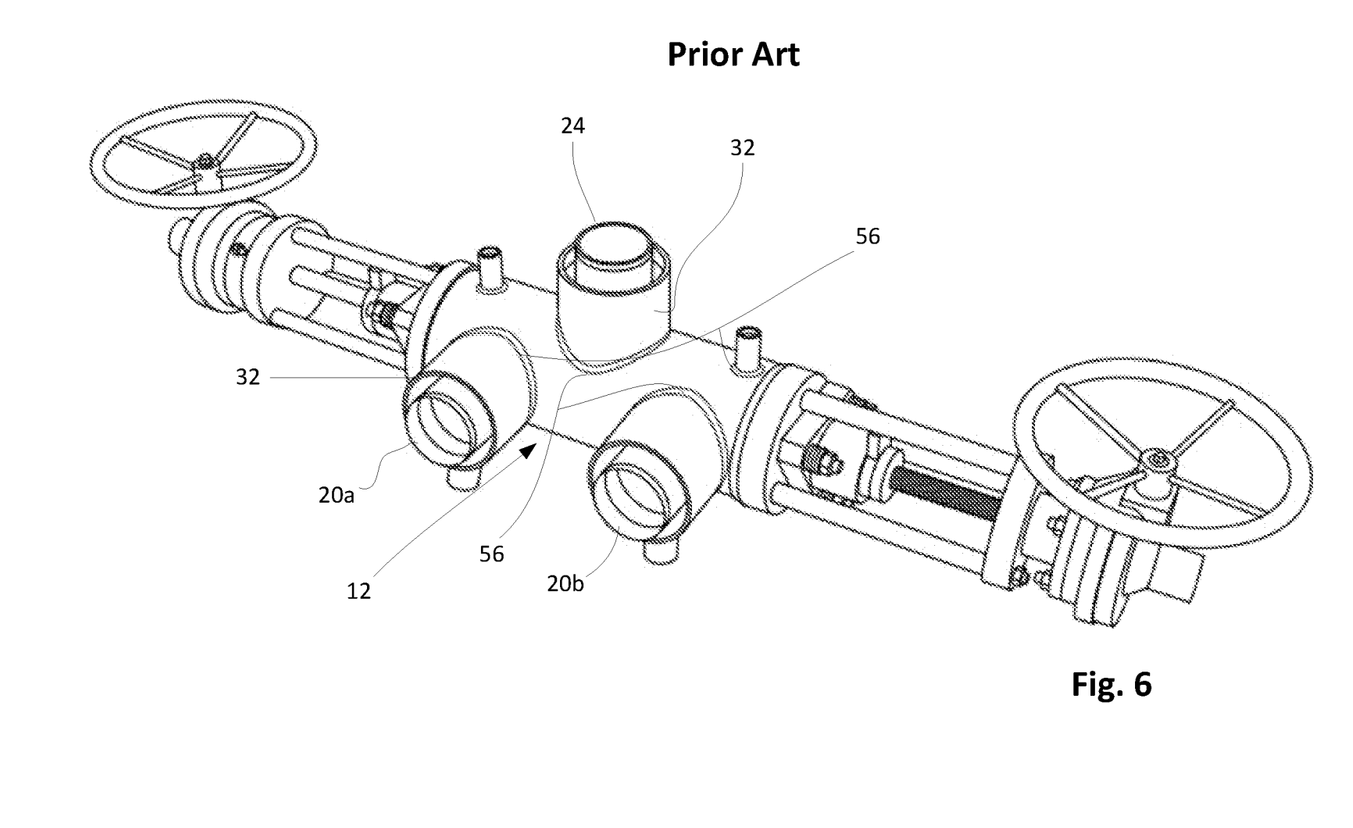
FIG. 6 is a lateral perspective view of a prior art 3-port valve.

As shown in FIG. 6, prior art 3-port valve has a valve body 12 formed from a pipe and has main port line 24 and sub-port lines 20a, 20b welded to the pipe of the valve body, not shown. Exterior to the valve body is a heating/cooling jacket, also formed from a section of pipe, and has cooling/heating lines 32 for passing a HTM through the inside of the jacket pipe and exterior of the valve body pipe. As shown, weldments 56 connect cooling/heating lines to the pipe forming the jacket. Similarly, main port line 24 and sub-port lines 20a, 20b are welded (not shown) to the main valve body pipe. The disadvantages of such a 3-port valve are described above in the "Description of the Prior Art" section, the main disadvantage being the failure of the weldments resulting in leakage of fluid from the valve body, or leakage of HTM from the heating/cooling jacket.

Figure 1:
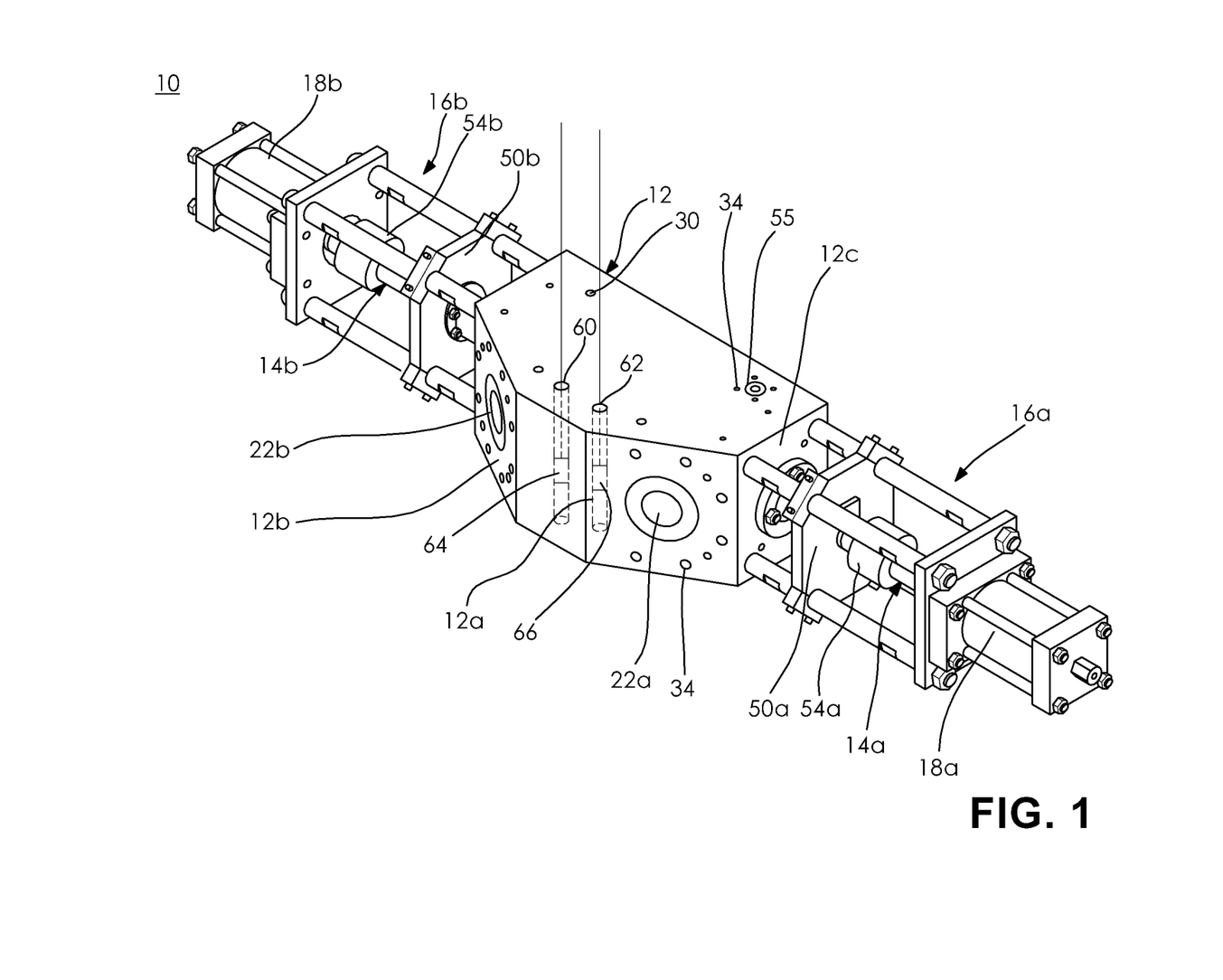
FIG. 1 is a lateral perspective view of sub-port lines of a 3-port valve according to the invention, taken at an angle from above.

The present invention of FIG. 1 illustrates a 3-port valve 10 comprising a valve body 12 and two valve members 14a, 14b displaceably mounted opposite one another in said valve body 12. The valve members 14a, 14b each have a valve member head 15a, 15b and a valve member shaft 15c, 15d on the distal side of said valve member head 15a, 15b. The valve member shaft 15c, 15d is mounted in a frame 16a, 16b where it is connected to an axial drive 18a, 18b and a rotary guide 18c, 18d. The rotary guide 18c, 18d converts the axial movement of the respective valve member 14a, 14b from the opening position into the closed position in such a manner that the respective valve member 14a, 14b will be rotated by 180° in the process.

The valve body 12 is made from a high-tempered steel ingot and may be surface hardened. Polymer melt is made to pass through the 3-port valve 10. Said polymer melt has an operating pressure of up to 300 bar and an operating temperature of up to 320° C.

The valve body 12 is provided with a first sub-port line 20a having a first sub-port opening 22a, a second sub-port line 20b having a second sub-port opening 22b, and a main port line 24 having a main port opening 26. Sub-port line 20a, sub-port line 20b and main port line 24 all come to intersect within the valve body 12 at a connecting region 58, indicated in FIG. 4 by dashed ellipse encircling the connecting region. Through connecting region 58, fluid may flow from main port line 24 to either or both of sub-port lines 20a or 20b.

The basic shape of the valve body 12 is a cuboid with a cuboid projection adjoining said cuboid, which cuboid projection has a symmetrical, equilateral trapezoidal cross-section with lateral surfaces 12a and 12b. The two sub-port openings 22a, 22b are arranged on the two lateral surfaces 12a, 12b of the valve body 12. The sub-port opening 22a is provided on the lateral surface 12a and the sub-port opening 22b is provided on the lateral surface 12b of the valve body 12. The sub-port lines 20a, 20b with the sub-port openings 22a, 22b arranged in the lateral surfaces 12a, 12b have been machined into the valve body 12 at angles α and β, respectively, measured clockwise from the longitudinal axis 57 of valve members 14a, 14b to the first and second center lines 38a and 38b (see FIG. 2). The valve body 12 is formed symmetrically to a median longitudinal plane through the main port line 24 longitudinal axis 28.

Embedded in the circumferential direction around the sub-port openings 22a, 22b and the main port opening 26 is a plurality of connection receptacles 34. The connection receptacles 34 may be in the form of threaded bolt holes for receiving corresponding threaded bolts for attaching a mounting flange and fluid lines (not shown) to the main and sub-port openings. The sub-port lines 20a, 20b are each adapted to be fluidically connected to a sub-line and the main port line 24 is adapted to be fluidically connected to a main line. For this purpose, corresponding connection means engage in the connection receptacle 34. The sub-lines and the main line are not shown. A vent valve (not shown either) is provided between each of the sub-port openings 22a, 22b and the sub-lines. Alternatively, the vent valves may also be integrated in the respective sub-port lines.

Plural cooling/heating line openings 30 for cooling/heating lines 32 are made in the top portion of the valve body 12, see FIG. 1. One or more of these openings 30 may be converted to a heat transfer medium inlet/outlet 55, having a plurality of connection receptacles 34, embedded in the circumferential direction around the inlet/outlet 55, for mounting a connection flange (not shown) to the inlet/outlet. Valve member openings 36a, 36b are arranged on the two side surfaces 12c, 12d of the cuboid basic shape of the valve body 12.

Figure 2:
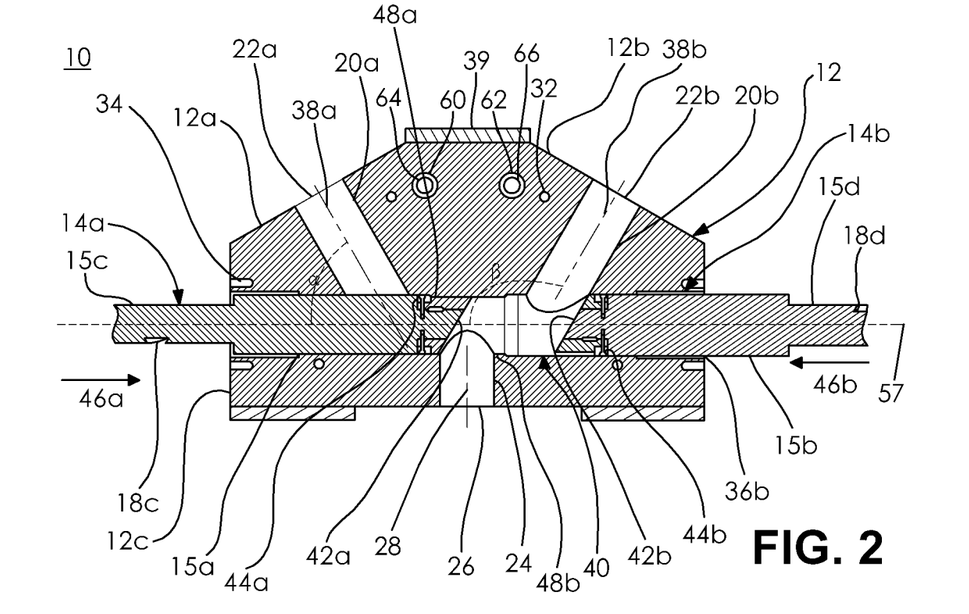
FIG. 2 is a schematic sectional view through the body of the 3-port valve in the area of the valve members, with the second valve member in an opening position and the first valve member in a closed position.
Figure 3:
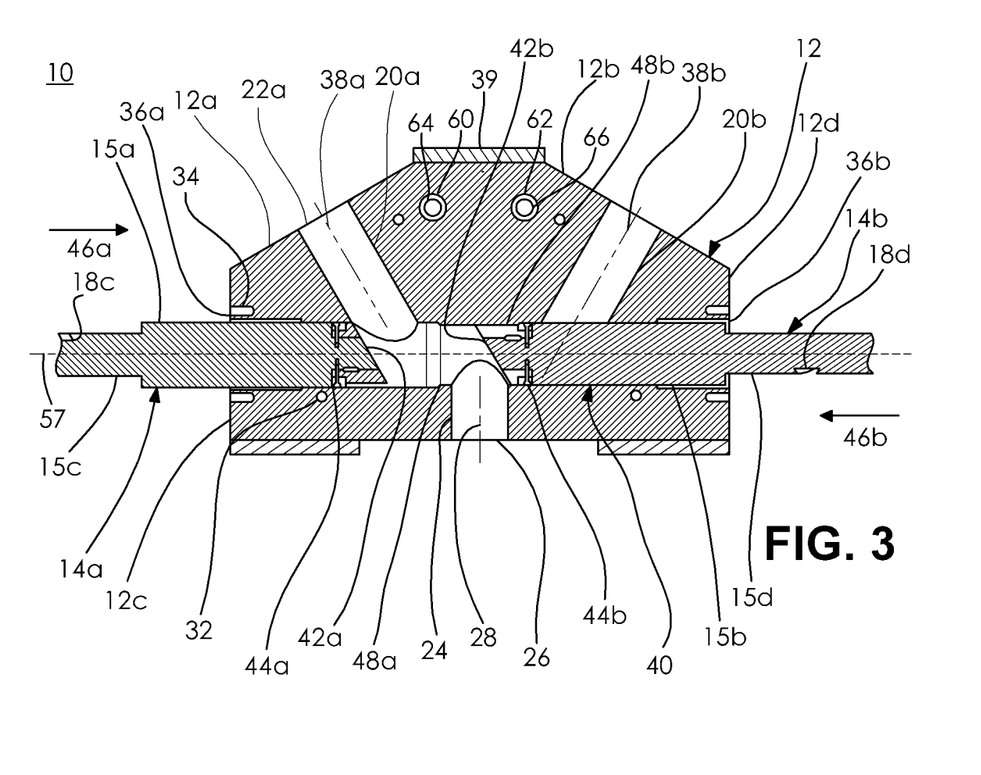
FIG. 3 is a horizontal sectional view through the body of the 3-port valve, with the first valve member in an opening position and the second valve member in a closed position.
Figure 4:
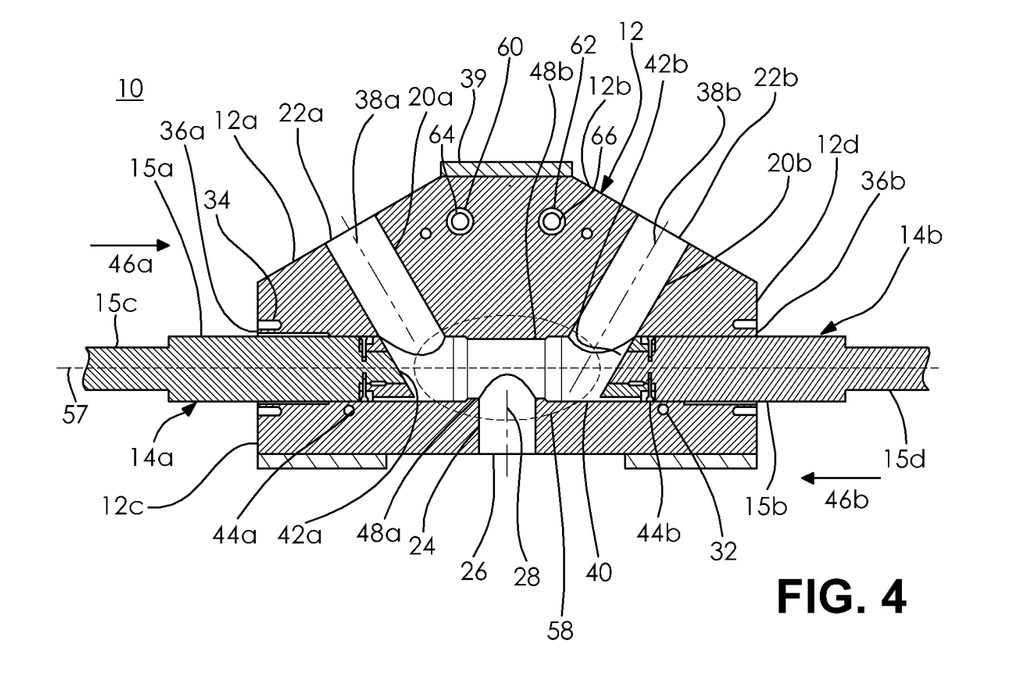
FIG. 4 is a horizontal sectional view through the body of the 3-port valve, with the first valve member in an opening position and the second valve member in an opening position.

Preferably, the sub-port openings 22a, 22b for the sub-port lines 20a, 20b, as shown in FIGS. 2 to 4, are arranged such that the center line axes 38a, 38b of the sub-port openings 22a, 22b define an angle of 120° between them. Other angle measures between center lines 38a and 38b may be acceptable, depending on the required configuration of the valve installation.

All the lines and openings in the valve body, with the associated components incorporated or to be incorporated therein, are preferably cylindrical in shape.

The valve members 14a, 14b are displaced as required between their respective opening and closed positions in the axial direction along the respective insertion direction 46a, 46b by the associated axial actuator 18a, 18b, and in this process are rotated by 180° by the associated rotary guide 18c, 18d.

FIG. 2 is a horizontal cross-sectional view of the body 12 of the 3-port valve 10 with the two valve members 14a, 14b. Insulating plates 39 are attached to the valve body 12 for thermal insulation, said plates 39 covering the entire valve body 12. For reasons of clarity, however, only partial areas of the valve body with the insulating plates 39 mounted thereon are shown. The two cylindrical valve members 14a, 14b each comprise a valve member shaft 15c, 15d that terminates in the axial drive 18a, 18b, resp., and a valve member head 15a, 15b, resp., that is arranged at the free end. The cylindrical valve members 14a, 14b are disposed in a cylindrical valve member receptacle 40 that extends through the valve body 12 from one valve member opening 36a to the other valve member opening 36b. Depending on the position of the valve members 14a, 14b, the valve member receptacle 40 is fluidically connected to the sub-port lines 20a, 20b and the main port line 24.

Both valve members 14a, 14b have chamfers 42a, 42b at the free end of the valve member head 15a, 15b. Said chamfers 42a, 42b are formed in such a way that, with the valve members 14a, 14b in an open position with respect to the sub-port lines 20a, 20b, the respective chamfer 42a, 42b will form an extension of the associated side wall of the sub-port lines 20a, 20b.

The two valve members 14a, 14b each have circumferential seals 44a, 44b provided on the valve member head 15a, 15b. The seals 44a, 44b are in sealing contact with the valve member receptacle 40. They each seal the valve member receptacle 40 in a direction opposite to the associated insertion direction 46a, 46b. The cylindrical valve member receptacle 40 has circumferential sealing surfaces 48a, 48b that are each provided between the main port line 24 and the sub-port lines 20a, 20b. In the closed position, the seals 44a, 44b are in sealing contact with the sealing surfaces 48a, 48b. When the valve members 14a, 14b are in an axial position along the respective insertion direction 46a, 46b, in which the seals 44a, 44b terminate with the sealing surfaces 48a, 48b, the valve member head 15a, 15b has been fully inserted into the valve member receptacle 40.

In FIG. 2, the second valve member 14b is seen in an opening position, with the first valve member 14a simultaneously in its closed position. The opening position of the second valve member 14b is characterized by the fact that the main port line 24 is fluidically connected to the second sub-port line 20b. The second valve member 14b has been rotated in the circumferential direction such that the second chamfer 42b forms an extension of the associated sidewall of the sub-port line 20b. In this position, the second valve member head 15b is not fully inserted in the valve member receptacle 40.

In its closed position, the first valve member 14a is rotated by 180° with respect to the second valve member 14b. Further, the seal 44a of the first valve member 14a is in contact with the first sealing surface 48a. As a result of the rotation and axial displacement of the first valve member 14b into the closed position, the fluidic connection of the main port line 24 and the first sub-port line 20a is closed by the first valve member 14a. At the same time, the first chamfer 42a is flush with the main port line 24, thus allowing a fluidic connection of the main port line 24 and the second sub-port line 20b, thus enabling a laminar flow of the polymer melt.

In FIG. 3, the first valve member 14a is seen in an opening position, with the second valve member 14b simultaneously in its closed position. The transfer into the opening and closed positions is achieved as described above for the respective other valve member 14a, 14b. In this case, the main port line 24 is fluidically connected to the first sub-port line 20a and the connection of main port line to the second sub-port line 20b is closed.

In FIG. 4, both valve members 14a and 14b are seen in their opening position. As a result, the main port line 24 is fluidically connected to both sub-port lines 20a, 20b.

Another positioning variant for the two valve members 14a, 14b is the closed position of both valve members 14a, 14b, not shown. In this case, the connection of the main port line 24 to each of the two sub-port lines 20a, 20b is closed. This prevents polymer melt from flowing through the 3-port valve 10.

Figure 5:
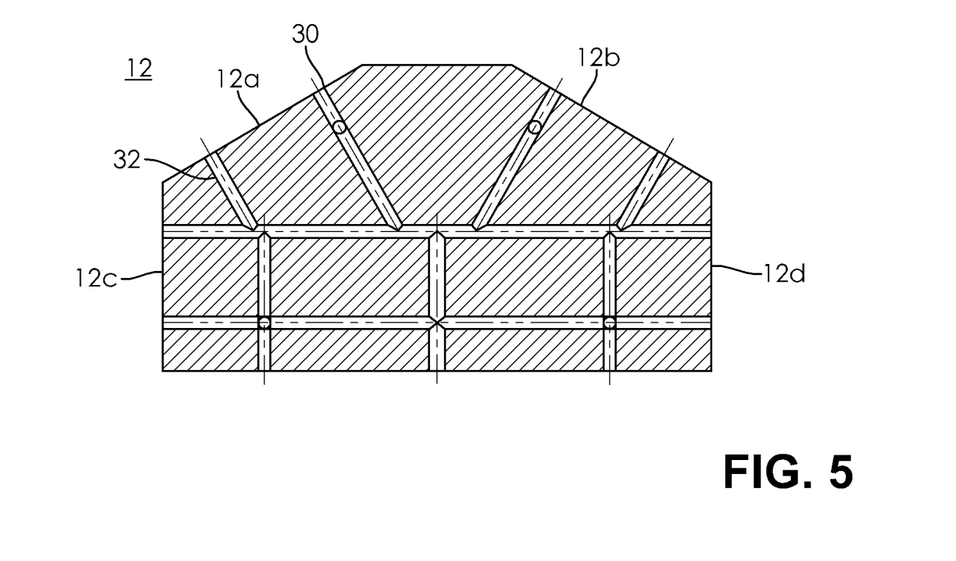
FIG. 5 is a horizontal sectional view through the body of the 3-port valve adjacent to a connecting region and to sub-port lines, with cooling/heating lines provided therein.

FIG. 5 is another horizontal cross-sectional view of the valve body 12, which is different in the vertical direction from the cross-sectional views of FIGS. 2 to 4, namely at a level of the cooling/heating lines 32. This view shows the cooling/heating lines 32 and their associated cooling/heating line openings 30. The cooling/heating lines 32 may each have the same circular diameter and may extend through the valve body 12 in both horizontal and vertical directions. The cooling/heating lines 32 form a three-dimensional grid around the lines 24, 20a, 20b and the valve member receptacle 40. More specifically, the cooling/heating line openings 30 are recessed into the top surface and the side surfaces 12c, 12d of the valve body 12.

In one embodiment, the horizontal cooling/heating lines 32 may terminate on both sides in a header line (not shown), thus ensuring that all lines are supplied via the header line. One header line is used for introducing the heat transfer medium, and the other header line is used for discharging the heat transfer medium.

In a preferred embodiment, the HTM may be introduced into the valve body at a single inlet line opening 30 and may exit at a single outlet line opening 30. In this case, all other line openings 30 will be plugged. The cooling/heating lines 32 with HTM passing therethrough prevent cooling of the polymer melt passed through the 3-port valve 10 and also act to maintain said polymer melt at a predetermined temperature.

A heat transfer medium, preferably superheated steam or thermal oil, is introduced into the cooling/heating lines 32. In addition to, or as an alternative to, the cooling/heating lines 32 with the heat transfer medium, receptacles 60, 62 for electrical heating cartridges 64, 66 may also be provided, in order to prevent temperature changes of the fluid passed through.

The valve body 12, made from a solid steel ingot, and with the cooling/heating lines 32, the sub-port lines 20a, 20b of the main port line 24 and the valve member receptacle 40 machined into and integral therewith, is a very compact design which easily meets the operating conditions, especially at high pressures and/or high temperatures. Jamming of the valve members 14a, 14b in the valve member receptacle 40 as a result of temperature or pressure is thus avoided. This is achieved with the material properties of the steel and with the possible addition of surface hardening, resulting in a reliable operation of the 3-port valve 10 even at high pressures and high temperatures. Leakage problems associated with prior art valves are also avoided. It should be pointed out that the valve body may be formed of materials other than a forged, or otherwise formed, steel ingot, as long as the choice of material has the properties to withstand the high pressures and temperatures involved without causing a locking of the valve members or leakage of the fluid or HTM.

LIST OF REFERENCE SIGNS 10 3-port valve
12 valve body
12a first lateral surface of valve body 12
12b second lateral surface of valve body 12
12c first side surface of valve body 12
12d second side surface of valve body 12
14a first valve member
14b second valve member
15a first valve member head
15b second valve member head
15c first valve member shaft
15d second valve member shaft
16a first frame
16b second frame
18a first axial drive
18b second axial drive
18c first rotary guide
18d second rotary guide
20a first sub-port line
20b second sub-port line
22a first sub-port opening
22b second sub-port opening
24 main port line
26 main port opening
28 longitudinal axis of main port line 24
30 cooling/heating line openings
32 cooling/heating lines
34 connection receptacle
36a first valve member opening
36b second valve member opening
38a first center line
38b second center line
39 insulating plate
40 valve member receptacle
42a first chamfer
42b second chamfer
44a first seal
44b second seal
46a first direction of insertion
46b second direction of insertion
48a first sealing surface
48b second sealing surface
50a first stop
50b second stop
54a first stop means
54b second stop means
55 heat transfer medium (HTM) inlet/outlet
56 weldments
57 longitudinal axis of valve members 14a, 14b
58 connecting region
60, 62 receptacles for electrical heating cartridges 64, 66
64, 66 electrical heating cartridges

What is claimed is:
1. A 3-port valve for passing fluids therethrough, comprising:

a valve body, a main port opening, a first sub-port opening and a second sub-port opening, said main port opening being adjoined by a main port line which ends in a connecting region;

said first sub-port opening having a first sub-port line connected to said connecting region;

said second sub-port opening having a second sub-port line connected to said connecting region;

multiple valve members arranged in said connecting region;

said valve members are displaced along a valve member axis between an opening position and a closed position thereof in said connecting region;

in a first valve position, said main port line is fluidically connected to said first sub-port line;

in a second valve position, said main port line is fluidically connected to said second sub-port line;

in a third valve position, said main port line is fluidically connected to said first and second sub-port lines;

in a fourth valve position, said main port line is fluidically connected neither to said first sub-port line nor to said second sub-port line;

said valve body is produced from a solid ingot;

in said connecting region said main port line, said first sub-port line, and said second sub-port line are machined into said solid ingot; and, said multiple valve members are rotatable by 180° about said valve members' axis when displaced from said opening position into said closed position.

2. The 3-port valve as claimed in claim 1, further comprising:

said valve body includes a cooling/heating element and a receptacle for said cooling/heating element;

said cooling/heating element comprising an electrical cartridge; and, said cooling/heating element is adapted to be inserted into the receptacle of said valve body.

3. The 3-port valve as claimed in claim 1, further comprising:

a heat transfer medium;

a plurality of cooling/heating lines;

said heat transfer medium flows through said plurality of cooling/heating lines.

4. The 3-port valve as claimed in claim 2, further comprising:

said receptacle is machined into said solid ingot.

5. The 3-port valve as claimed in claim 3, further comprising, said plurality of cooling/heating lines is a bore that has been machined into said solid ingot.

6. The 3-port valve as claimed in claim 2, further comprising:

multiple electrical cartridges;

said valve body comprises multiple receptacles extending in different directions within said valve body thus ensuring uniform tempering of said valve body.

7. The 3-port valve as claimed in claim 3, further comprising:

a plurality of cooling/heating lines extend in different directions within said valve body, thus ensuring uniform tempering of said valve body.

8. The 3-port valve as claimed in claim 1, further comprising said valve body is surface-hardened.

9. The 3-port valve as claimed in claim 1, further comprising:

said multiple valve members comprise a first valve member and a second valve member arranged opposite each other, said first and second valve members each having a front portion which extends towards said connecting region, said first and second valve members being adapted to be displaced along a common valve member axis between an opening position and a closed position thereof in said connecting region, respectively, said first valve position constituted by an open position of said first valve member and a closed position of said second valve member, said second valve position constituted by an open position of said second valve member and a closed position of said first valve member, said third valve position constituted by an open position of both said first and second valve members, and, said fourth valve position constituted by a closed position of both said first and second valve members.

10. The 3-port valve as claimed in claim 9, further comprising said first sub-port line is oriented at a first angle relative to said valve member axis.

11. The 3-port valve as claimed in claim 10, further comprising said second sub-port line is oriented at a second angle relative to said valve member axis.

12. The 3-port valve as claimed in claim 11, further comprising said first and second angles are measured clockwise from the valve member axis and add up to 180°.

13. The 3-port valve as claimed in claim 10, further comprising a front portion of said first valve member in said opening position has a chamfer corresponding to said first angle.

14. The 3-port valve as claimed in claim 11, further comprising a front portion of said second valve member in said opening position has a chamfer corresponding to said second angle.

15. The 3-port valve as claimed in claim 9, further comprising, in said closed position of said first and second valve members, said first and second valve members each have a front portion that bears sealingly against an annular surface in said valve body.

16. A 3-port valve for passing fluids therethrough, comprising:

a valve body; a main port opening, a first sub-port opening and a second sub-port opening, said main port opening adjoined by a main port line which ends in a connecting region;

said first sub-port opening has a first sub-port line connected to said connecting region;

said second sub-port opening has a second sub-port line connected to said connecting region;

multiple valve members arranged in said connecting region;

said valve members are displaced along a valve member axis between an open position and a closed position thereof in said connecting region;

in a first valve position, said main port line is fluidically connected to said first sub-port line;

in a second valve position, said main port line is fluidically connected to said second sub-port line;

in a third valve position, said main port line is fluidically connected to said first and second sub-port lines;

in a fourth valve position, said main port line is fluidically connected neither to said first sub-port line nor to said second sub-port line, said valve body is produced from a solid ingot;

in said connecting region, said main port line, said first sub-port line, and second sub-port lines are machined into said solid ingot, a plurality of cooling/heating lines form a three-dimensional grid around said first and second sub-port lines, main port line and said valve member receptacle, and, wherein said plurality of heating/cooling lines are machined into the solid ingot.

17. The 3-port valve as claimed in claim 1, further comprising, a longitudinal axis of the connecting region and the valve member axis are identical.

18. The 3-port valve as claimed in claim 1, further comprising said valve body is insulated on the outside with insulating plates mounted on said valve body.

19. The 3-port valve as claimed in claim 1, further comprising said main port line is oriented at a right angle relative to said valve member axis.

* * * * *